April 25, 1933.      C. H. MORROW      1,905,734
DRAFT REGULATOR
Filed April 12, 1930
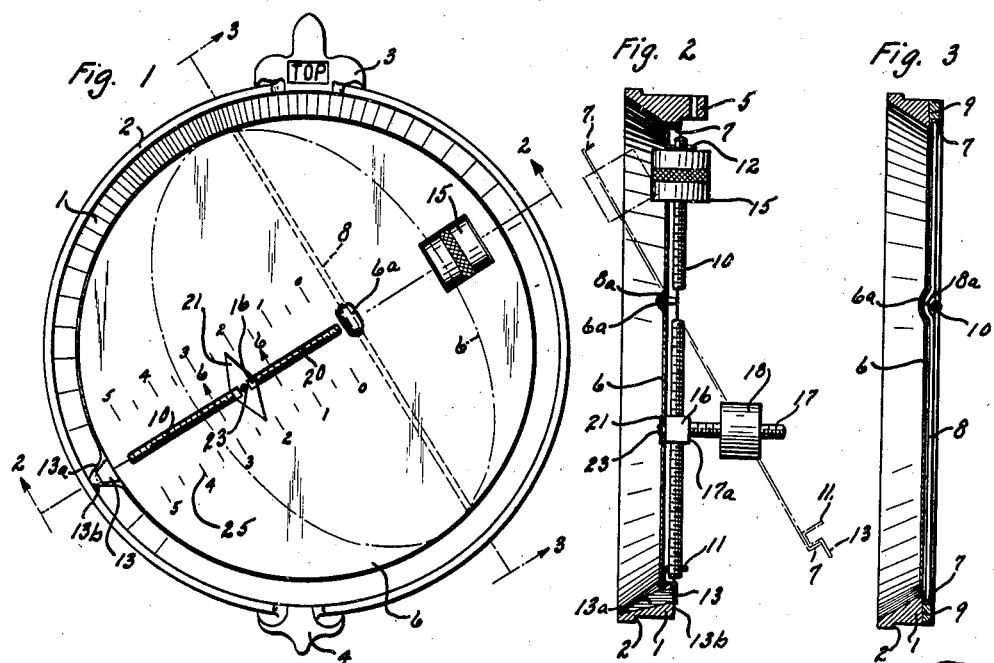
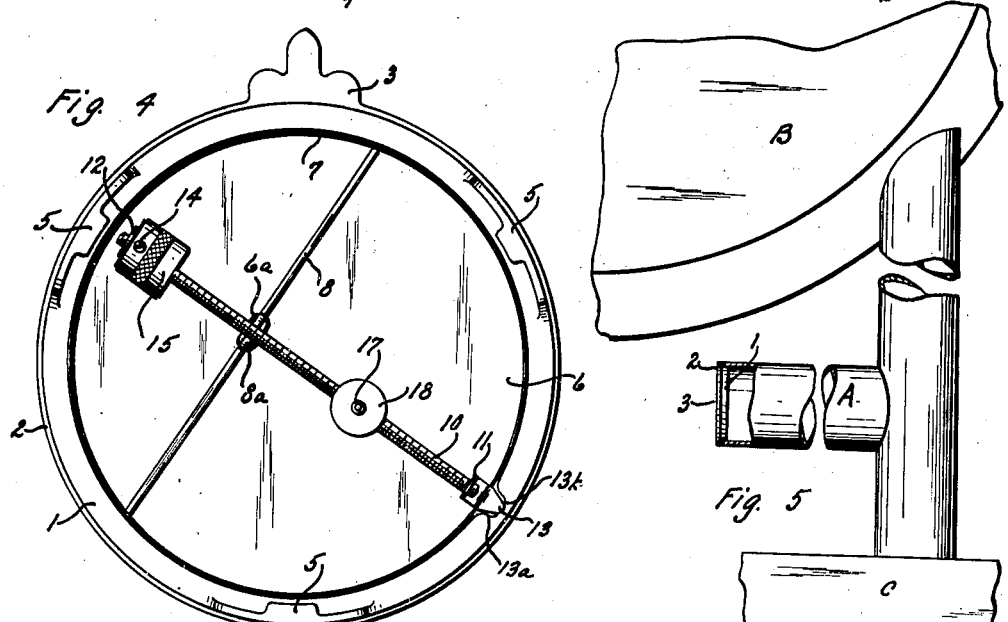
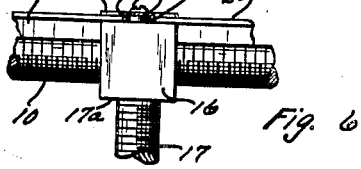
INVENTOR
Clarence H. Morrow
BY
Brockett, Hyde, Higley & Meyer
ATTORNEYS Patented Apr. 25, 1933

1,905,734

UNITED STATES PATENT OFFICE

CLARENCE H. MORROW, OF CLEVELAND, OHIO, ASSIGNOR TO THE HOTSTREAM HEATER COMPANY, OF CLEVELAND, OHIO, A CORPORATION OF OHIO

DRAFT REGULATOR

Application filed April 12, 1930. Serial No. 443,767.

This invention relates to draft regulators for use with furnaces or in like places.

The object of the invention is to provide a simple and improved regulator which may be constructed at relatively low cost and is not likely to get out of order in service; which is readily applied and capable of convenient adjustment in use; which is delicate and yet rugged in operation; and which supplies not only convenient adjustment but also an indication of its condition of adjustment at all times.

Further objects of the invention are in part obvious and in part will appear more in detail hereinafter.

In the drawing, which represents one suitable embodiment of the invention, Fig. 1 is a front elevation; Fig. 2 is a detail sectional elevation on the line 2—2, Fig. 1; Fig. 3 is a similar section on the line 3—3, Fig. 1; Fig. 4 is a rear elevation; Fig. 5 is a plan view, illustrating the use of the invention on a furnace; and Fig. 6 is a detail section on a larger scale on the line 6—6, Fig. 1.

The regulator shown in the drawing comprises a suitable body or frame member designed for convenient mounting upon and attachment to the pipe member with which it is to be used, such as a flue or the arm of a pipe T, as at A, Fig. 5, where the regulator is used as a check draft regulator, although not limited to such use or to the particular manner of installation shown, to wit, in Fig. 5 the regulator is in a T attached to the smoke pipe between the furnace B and the stack C, but it is useful in other arrangements and for other purposes.

The frame shown is a ring-like member 1 provided with an external annular shoulder 2 and designed to be telescoped within the pipe flue or T arm, so that the general plane of the ring is vertical. Said ring is not designed or intended for rotative or other adjustment in the pipe, but rather is installed in one and only one definite position, for which purpose the ring may be provided with means for determining its proper position, such as one or both of the special pointers or indicators 3, 4 to be placed at top or bottom, as the case may be. Said ring also may be provided with inward extensions or ears 5 and after it is pushed home to its telescoped position within the pipe or flue, it may be attached thereto by suitable screws or bolts passed through openings in the pipe into inward extensions or ears 5 on the ring frame.

In the ring-like frame is mounted a swinging shutter member 6, which is a simple light sheet metal disc slightly smaller than the ring opening and preferably strengthened by a small peripheral flange 7. Said shutter is mounted to turn in the opening upon a transverse axis or chord, which preferably is not a diameter, and which axis is also inclined to the horizontal. Said axis is represented by the section line 3—3, Fig. 1, and is there shown as extending at an angle of about 57° to the horizontal, which is found in practice to be apparently the most satisfactory inclination, although the invention is not limited thereto.

Swinging mounting on said axis is effected in any suitable manner such as by attaching the shutter disc to a rod 8 whose pointed ends bear and turn in the inner recessed ends of bearing screws 9 threaded into openings in the ring wall and adjustable from their outer ends. The shutter axle or rod 8, of course, lies on one of its faces, and in the arrangement shown, on its inner face, and relative movement of the shutter and said rod in the direction of the length of the rod may be prevented by depressing the metal of the disc, as at 6a, to receive a bent or deflected portion 8a of the rod. In the arrangement shown this bent or deflected portion of the rod passes around an adjusting screw 10, lying between said screw and the disc 6. The screw extends across the disc in a direction transverse to its axis of swinging movement and at its ends is journalled in openings in small lugs or brackets 11, 12 fastened to the disc. One of said brackets, such as the bracket 11, may be provided with an outward extension or arm 13 which engages the ring and serves as a stop to limit movement of the shutter beyond the vertical position shown in Fig. 2, when desired. By omitting said projection or cutting it off, the disc may be permitted to swing freely in both directions. By properly arranging the arm 13 and that portion of the frame with which it cooperates so as to enable the arm 13 to overlap the frame abutment only slightly, such as by recessing the frame at 13a, Fig. 2, to form a very small shoulder 13b to receive the impact of the arm 13 and by making said arm 13 of spring metal, it is possible to safeguard the draft regulator and the conduit system against sudden pressure changes. With this arrangement, upon a sudden back draft that would cause the shutter to slam to closed position, the arm 13 would spring and snap past the frame abutment and not only safeguard the shutter but also provide a free and open outlet for release of pressure. If such operation occurs, of course the shutter must be forcibly pushed back into the normal operation position so that the arm 13 lies on the inner side of the abutment 13b. Other arrangements are, of course, suitable for the purpose.

On the screw 10 and secured thereto by a set screw 14 is a head 15, shown as of cylindrical form and large enough to pass through an opening in the disc 6, as shown in Fig. 2. This head 15 is usually made of metal and is of such size and weight as to serve as a counterbalance. In other words, since the disc is pivoted on an axis at one side of its center, the metal of the disc alone is unequally distributed around said axis, and the heavier or additional head 15 is preferably made of about the right weight so as to counterbalance the unequal distribution of the metal of the disc and of the screw shaft 10. Omitting other parts such as the traveling nut and weight to be later described, the disc, screw shaft and the head thereon are properly balanced around the central axis and if unaffected by air movement would remain in any position to which they may be adjusted.

The screw shaft 10 serves as an adjustor or actuator for a movable weight whose purpose is to determine the draft necessary to open the shutter. In the arrangement shown, the screw shaft 10 carries a nut 16 threaded upon it and provided with a threaded extension 17 on which is screwed a weight 18. Said weight may either be adjustable on the threaded part 17 or screwed home to a fixed position against the shoulder 17a of the nut. The nut 16, opposite the threaded extension 17, is provided with a small round projection 19, Fig. 6, entering a slot or recess 20 in the disc 6 and extending lengthwise of the screw shaft. In Fig. 1 the screw shaft is visible through the slot 20. On the outer end of the extension 19 and also upon the opposite face of the disc 6 is an indicator consisting of a more or less diamond shaped member 21 provided with two ears 22 bent down alongside of the projection 19 and entering the slot 20. The indicator 21 is fastened by a screw 23.

With this arrangement, considering that the disc 6, screw 10 and head 15 as a whole are balanced around the axis of rotation, it is obvious that the only turning moments upon said disc are the effect of the weight 18, including the nut 16 and other associated parts, and any air current moving through the pipe. By turning the screw, the traveling nut 16 may be moved along it to any position along the slot 20 and obviously, the farther said weight is moved away from the axis of rotation, the more resistance is provided to oppose opening of the shutter by the air current. As a result, by proper adjustment of the weight, the shutter may be adjusted to open at any desired draft value, and such values may be indicated on the exposed face of the plate by suitable marks, as at 25. Furthermore, the setting of the draft regulator may be varied at any time by simply turning the head 15 to change the setting of the weight 18, its position at all times being indicated by the pointer 21.

This draft regulator is quite sensitive and delicate in operation. Nevertheless, it is rugged and not likely to get out of order in service. Its attachment and its mode of operation are quite simple and require no special or complicated instructions.

What I claim is:

1. An automatic damper of the class described, comprising an annular base adapted to be secured with the pipe through which flow is to be controlled, a shutter mounted on said base for swinging movement about a non-diametric axis in the plane thereof, a threaded spindle carried by said shutter on one side thereof at right angles to said axis, said shutter having an opening in its short stretch from said axis, a head secured upon said spindle and projecting through said opening, whereby the spindle may be rotated from either side of said shutter, said head having mass to substantially balance the shutter upon its axis whereby the head serves as a counterbalance for the long stretch of the shutter, and a weight threaded on said spindle for adjustment thereon through said long stretch of the shutter, said weight extending from said shutter substantially beyond said spindle whereby its center of mass is substantially offset from the plane of the shutter.

2. An automatic damper of the class described, comprising an annular base adapted to be secured with the pipe through which flow is to be controlled, a shutter mounted on said base for swinging movement about a non-diametric axis in the plane thereof, a threaded spindle carried by said shutter on one side thereof at right angles to said axis, said shutter having an opening in its short stretch from said axis, a head secured upon said spindle and projecting through said opening, whereby the spindle may be rotated from the opposite side of said shutter, said head having mass to substantially balance the shutter upon its axis whereby the head serves as a counterbalance for the long stretch of the shutter, a weight threaded on said spindle for adjustment thereon through said long stretch of the shutter, said weight extending from said shutter substantially beyond said spindle whereby its center of mass is substantially offset from the plane of the shutter, said shutter having a slot along the path of said weight, and an indicator associated with said weight for movement along said slot whereby the location of said weight is visible from said opposite shutter side.

3. An automatic damper of the class described comprising an annular base adapted to be secured to the pipe through which flow is to be controlled, a shutter mounted on said base for swinging movement about a non-diametric axis in the plane of the base, a counter-balance on the short stretch of said shutter for balancing said shutter about said axis, and a weight mounted on the long shutter stretch for adjustment toward and from said axis in a plane to which said axis is perpendicular, whereby the operating characteristics of said shutter follow directly those of said weight.

In testimony whereof I hereby affix my signature.

CLARENCE H. MORROW.